US008818679B2

(12) United States Patent
Inoue et al.

(10) Patent No.: US 8,818,679 B2
(45) Date of Patent: Aug. 26, 2014

(54) VEHICLE CONTROL DEVICE AND VEHICLE CONTROL METHOD

(75) Inventors: Gen Inoue, Susono (JP); Yasuhito Ishida, Toyokawa (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1360 days.

(21) Appl. No.: 12/230,852

(22) Filed: Sep. 5, 2008

(65) Prior Publication Data

US 2009/0069997 A1    Mar. 12, 2009

(30) Foreign Application Priority Data

Sep. 6, 2007   (JP) ................................ 2007-231300

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |

(52) U.S. Cl.
USPC ...................... 701/96; 701/1; 701/97; 701/98

(58) Field of Classification Search
None
See application file for complete search history.

(56) References Cited

U.S. PATENT DOCUMENTS

| | | | | |
|---|---|---|---|---|
| 4,777,611 A | * | 10/1988 | Tashiro et al. ................. 702/148 |
| 4,876,527 A | * | 10/1989 | Oka et al. ....................... 340/441 |
| 4,885,710 A | | 12/1989 | Hersberger et al. |
| 4,989,923 A | | 2/1991 | Lee et al. |
| 5,301,130 A | * | 4/1994 | Alcone et al. ................. 702/141 |
| 5,305,241 A | * | 4/1994 | Hayashi et al. ................. 702/94 |
| 5,377,535 A | * | 1/1995 | Angermaier et al. ...... 73/114.26 |
| 5,557,552 A | * | 9/1996 | Naito et al. .................... 702/148 |
| 5,612,879 A | | 3/1997 | Makino |
| 5,811,679 A | * | 9/1998 | Hara et al. ....................... 73/488 |
| 5,819,193 A | | 10/1998 | Burgdorf et al. |
| 6,142,026 A | * | 11/2000 | Ohashi et al. ................. 73/865.9 |
| 6,384,594 B1 | * | 5/2002 | Uehara et al. ................. 324/173 |
| 6,446,018 B1 | * | 9/2002 | Isermann et al. ............... 702/96 |
| 6,560,539 B1 | | 5/2003 | Mueller et al. |

(Continued)

FOREIGN PATENT DOCUMENTS

| | | |
|---|---|---|
| DE | 43 14 449 A1 | 11/1994 |
| EP | 0 992 411 B1 | 11/2005 |

(Continued)

OTHER PUBLICATIONS

Office Action issued in German Patent Application No. 11 2008 002 422.7-51, on Aug. 4, 2010 (with translation).
Office Action dated Feb. 14, 2012 in U.S. Appl. No. 12/674,283.

*Primary Examiner* — Bhavesh V Amin
(74) *Attorney, Agent, or Firm* — Oliff PLC (57) ABSTRACT

A vehicle control device for controlling the driving force and braking force that is applies to a vehicle to maintain a target wheel speed includes: a plurality of determination parts each of which determines the wheel speed of a corresponding one of a plurality of wheels of the vehicle; a calculation part that calculates the wheel speed validity threshold for each wheel based on the determined wheel speeds; a decision part that decides whether the wheel speed validity threshold calculated for each wheel is below a specific threshold speed; a setting part that resets the target wheel speed depending on the result of the decision by the decision part; and an estimation part that estimates the vehicle speed based on the determined wheel speeds.

8 Claims, 10 Drawing Sheets

(56) References Cited

U.S. PATENT DOCUMENTS

| | | |
|---|---|---|
| 6,999,859 B2 * | 2/2006 | Kin .................................. 701/1 |
| 2003/0038537 A1 * | 2/2003 | Okai ............................ 303/122 |
| 2007/0120661 A1 * | 5/2007 | Ponziani ....................... 340/476 |

FOREIGN PATENT DOCUMENTS

| | | |
|---|---|---|
| EP | 1 055 574 B1 | 12/2005 |
| JP | A-07-257352 | 10/1995 |
| JP | A-2004-90679 | 3/2004 |

* cited by examiner

VEHICLE CONTROL DEVICE AND VEHICLE CONTROL METHOD

INCORPORATION BY REFERENCE

The disclosure of Japanese Patent Application No. 2007-231300 filed on Sep. 6, 2007, including the specification, drawings and abstract is incorporated herein by reference in its entirety.

BACKGROUND OF THE INVENTION

1. Field of Invention

The present invention relates to a technique for accurately estimating vehicle speed to prevent erroneous control of a vehicle control device such as an anti-skid control device (ABS), traction control device (TRC) or rear wheel steering device (4WS).

2. Description of Related Art

For a vehicle control device that executes a vehicle control operation based on the vehicle speed, the validity of the wheel speeds, which are used to calculate the vehicle speed, is critical. In particular, if the vehicle is traveling at a low speed, the validity of detection values may be inaccurate because the outputs from wheel speed sensors are below the detectable speed level. Thus, it is necessary to accurately determine the validity of the wheel speeds using the lowest calculated wheel speed value, in other words, a wheel speed validity threshold.

For example, Japanese Patent Application Publication No. 7-257352 (JP-A-7-257352) describes a vehicle control device that selects the higher of the lowest calculated wheel speed and a permission speed, which is a threshold speed for permitting execution of the vehicle control, and compares the selected value and the vehicle body speed to determine whether to execute a control operation.

However, the vehicle control device described in JP-A-7-257352 may be unable to set a target vehicle speed of the vehicle properly and cause speed hunting depending on the lowest calculated wheel speed when executing a constant speed traveling control operation at a low speed of 0 to 5 km/h as disclosed in Japanese Patent Application Publication No. 2004-90679 (JP-A-2004-90679). Also, the actual vehicle speed may deviate greatly from the target vehicle speed when a constant speed traveling is performed at a low speed.

SUMMARY OF THE INVENTION

The present invention provides a vehicle control device and a vehicle control method that avoids speed hunting even during a constant low-speed traveling control operation.

A first aspect of the present invention relates to a vehicle control device. The vehicle control device controls the driving force and braking force that is applied to a vehicle to maintain a target wheel speed. The vehicle control device includes: a plurality of determination parts each of which determines the wheel speed of a corresponding one of a plurality of wheels of the vehicle; a calculation part that calculates the wheel speed validity threshold for each wheel based on the determined wheel speeds; a decision part that decides whether the wheel speed of each wheel is valid depending on whether the wheel speed validity threshold calculated for each wheel is below a specific threshold speed; a setting part that resets the target wheel speed to a speed that is higher than one of the wheel speed validity thresholds calculated for the wheels, depending on the result of the decision by the decision part; and an estimation part that estimates the vehicle speed based on the determined wheel speeds.

A second aspect of the present invention relates to a vehicle control method. The vehicle control method is a method for controlling the driving force and braking force that is applied to a vehicle to maintain a target wheel speed. The vehicle control method includes: determining wheel speeds of a plurality of wheels of the vehicle; calculating a wheel speed validity threshold for each wheel based on the determined wheel speeds; deciding whether the wheel speed of each wheel is valid depending on whether the calculated wheel speed validity threshold for each wheel is below a specific threshold speed; resetting the target wheel speed to a speed that is higher than one of the calculated wheel speed validity thresholds depending on the result of the decision; and estimating the vehicle speed based on the determined wheel speeds.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
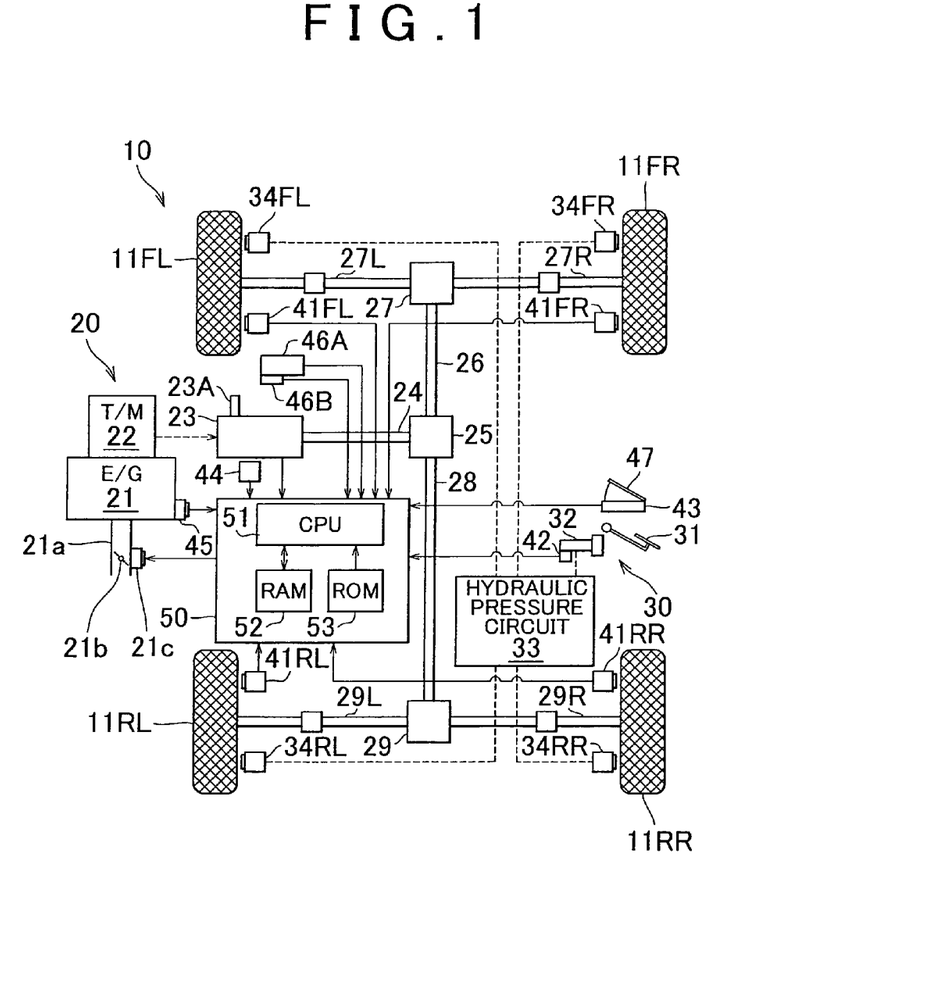
FIG. 1 is a schematic plan view that illustrates a vehicle equipped with a vehicle control device according to a first embodiment of the present invention.

FIG. 1 is a schematic plan view that illustrates a vehicle equipped with a vehicle control device according to a first embodiment of the present invention. Referring to FIG. 1, a specific example of a vehicle 10 equipped with the vehicle control device according to the first embodiment of the present invention is described.

The vehicle 10 shown in FIG. 1 is a four-wheel-drive vehicle, and includes a right front wheel 11FR, a left front wheel 11FL, a right rear wheel 11RR and a left rear wheel 11RL. The vehicle 10 also has a drive unit 20 and a brake system 30.

The drive unit 20 has an engine 21, which serves as a drive power source for the vehicle 10, a transmission 22, a transfer 23, an output shaft 24, and a center differential 25.

The engine 21 may be a conventional spark ignition internal combustion engine equipped with an electronic fuel injection device (not shown), for example. The engine 21 has an intake pipe 21a that defines an intake passage, a throttle valve 21b, and a throttle valve actuator 21c.

The throttle valve 21b is rotatably supported in the intake pipe 21a. The opening amount of the throttle valve 21b is adjusted to change the open cross-sectional area in the intake pipe 21a, whereby the output torque of the engine 21 is changed. The throttle valve actuator 21c changes the rotational angle of the throttle valve 21b in response to a drive signal (that is, command signal).

The transmission 22 may include a conventional gear mechanism. The transmission 22 establishes a specific transmission ratio according to the driving conditions of the vehicle 10.

The transfer 23 includes an auxiliary transmission that comprises a conventional gear mechanism. The transfer 23 transmits drive power in a power transmission mode for a high-speed gear ratio (which may be hereinafter referred to as "H-range mode" as needed) or a power transmission mode for a low-speed gear ratio (which may be hereinafter referred to as "L-range mode" as needed) when an operation lever 23A is operated by the driver. In addition, the transfer 23 outputs a signal that indicates whether the operation lever 23A is in the "H-range mode" position or the "L-range mode" position to an electronic control device 50.

With the above configuration, the output torque of the engine 21 (the power generated by the driving source) is converted according to the specific transmission gear ratio, which is determined based on the conditions of the transmission 22 and the transfer 23. The output shaft 24 transmits the converted torque to the center differential 25.

In addition, the drive unit 20 has a front wheel propeller shaft 26, a front differential 27, a right front wheel driveshaft 27R and a left front wheel driveshaft 27L. The front wheel propeller shaft 26 transmits the torque output from the center differential 25 via the output shaft 24 to the front differential 27. The front differential 27 transmits the torque transmitted from the front wheel propeller shaft 26 to the right front wheel driveshaft 27R and the left front wheel driveshaft 27L. The right front wheel driveshaft 27R rotates the right front wheel 11FR with the torque transmitted thereto from the front differential 27. Similarly, the left front wheel driveshaft 27L rotates the left front wheel 11FL with the torque transmitted thereto from the front differential 27.

Further, the drive unit 20 has a rear wheel propeller shaft 28, a rear differential 29, a right rear wheel driveshaft 29R, and a left rear wheel driveshaft 29L. The rear wheel propeller shaft 28 transmits the torque output from the center differential 25 to the rear differential 29. The rear differential 29 transmits the torque transmitted from the rear wheel propeller shaft 28 to the right rear wheel driveshaft 29R and the left rear wheel driveshaft 29L. The right rear wheel driveshaft 29R rotates the right rear wheel 11RR with the torque transmitted thereto from the rear differential 29. Similarly, the left rear wheel driveshaft 29L rotates the left rear wheel 11RL with the torque transmitted thereto from the rear differential 29.

With the above configuration, the output torque of the engine 21 is converted into driving forces to rotate the right front wheel 11FR, the left front wheel 11FL, the right rear wheel 11RR, and the left rear wheel 11RL.

The brake system 30 has a brake pedal 31, a master cylinder 32, a hydraulic pressure circuit 33, and wheel cylinders 34FR, 34FL, 34RR and 34RL.

A conventional master cylinder 32 that increases and decreases the hydraulic pressure of brake oil (that is, master cylinder pressure) may be used. The hydraulic pressure is transmitted to the hydraulic pressure circuit 33 in accordance with the degree of displacement of the brake pedal 31.

The hydraulic pressure circuit 33 has a reservoir, an oil pump and various types of valves (not shown), and produces a temporary braking hydraulic pressure that is applied to the wheel cylinders 34FR, 34FL, 34RR and 34RL in response to a signal from the electronic control device 50. The hydraulic pressure circuit 33 applies either the master cylinder pressure or the produced temporary braking hydraulic pressure to the wheel cylinders 34FR, 34FL, 34RR and 34RL as a final braking hydraulic pressure based on a signal from the electronic control device 50.

The wheel cylinders 34FR, 34FL, 34RR and 34RL are positioned at the right front wheel 11FR, the left front wheel 11FL, the right rear wheel 11RR and the left rear wheel 11RL, respectively. The wheel cylinders 34FR, 34FL, 34RR and 34RL generate the braking force necessary to reduce the rotational speed of the rotors of the right front wheel 11FR, the left front wheel 11FL, the right rear wheel 11RR, and the left rear wheel 11RL based on the braking hydraulic pressure applied by the hydraulic pressure circuit 33.

With the above configuration, the master cylinder pressure of the braking hydraulic pressure adjusted by the hydraulic pressure circuit 33 is converted into braking force required to reduce the rotational speed of the right front wheel 11FR, the left front wheel 11FL, the right rear wheel 11RR, and the left rear wheel 11RL.

The vehicle braking force is the sum total of the forces applied to the wheels to reduce the rotational speed of the wheels, and is applied in a direction opposite to the vehicle driving force which propels the vehicle in the traveling direction. In the following description, the force applied at each wheel is referred to as "wheel braking force," and the overall force applied to the vehicle is referred to as "vehicle braking force."

The electronic control device 50 is connected to wheel speed sensors 41FR, 41FL, 41RR and 41RL, a pressure sensor 42, an accelerator operation amount sensor 43, a tilt sensor 44, an engine speed sensor 45, a constant speed traveling control switch 46A, and a target vehicle speed selector 46B.

The wheel speed sensors 41FR, 41FL, 41RR and 41RL detect a wheel speed VWFR of the right front wheel 11FR, a wheel speed VWFL of the left front wheel 11FL, a wheel speed VWRR of the right rear wheel 11RR, and a wheel speed VWRL of the left rear wheel 11RL, respectively, and output signals indicating the detected wheel speeds to the electronic control device 50.

The pressure sensor 42 detects the master cylinder pressure Pm and outputs a signal indicating the detected master cylinder pressure Pm to the electronic control device 50.

The accelerator operation amount sensor 43 detects the displacement Ap of the accelerator pedal 47, and outputs a signal indicating the detected displacement to the electronic control device 50.

The tilt sensor 44 outputs a signal indicating the pitch of the vehicle to the electronic control device 50. A pitch of "0"

means that the vehicle is level, and a positive pitch means that the front of the vehicle is higher in elevation that the rear of the vehicle.

The engine speed sensor 45 detects a rotation signal NE from the engine 21 and outputs a signal indicating the detected rotation signal NE to the electronic control device 50.

The constant speed traveling control switch 46A outputs a signal indicating an ON state or OFF state selected by the driver to the electronic control device 50. The target vehicle speed selector 46B outputs a signal indicating the position of the target vehicle speed selector 46B (Hi, Mid or Lo) selected by the driver to the electronic control device 50. The signal indicating the position of the target vehicle speed selector 46B is used to set a target vehicle speed.

The electronic control device 50 may be a conventional microcomputer including a CPU (central Processing Unit) 51, a RAM (Random Access Memory) 52, a ROM (Read-Only Memory) 53 and an input-output port. The input-output port is electrically connected to the sensors 41 to 45, the constant speed traveling control switch 46A, the target vehicle speed selector 46B, the throttle valve actuator 21c, and the hydraulic pressure circuit 33 of the brake system 30. The input-output port supplies the signals from the sensors 41 to 45, the constant speed traveling control switch 46A, and the target vehicle speed selector 46B to the CPU 51. Also a drive signal to the throttle valve actuator 21c and a brake signal to the hydraulic pressure circuit 33 are output through the input-output port based on the result of operation of the CPU 51.

The CPU 51 in FIG. 1 may be regarded as the "decision part," "update part," "estimation part," "setting part" and "prohibition part" of the present invention. In addition, the wheel speed sensors 41FR, 41FL, 41RR and 41RL may be regarded as the "determination parts" of the present invention.

Figure 2:
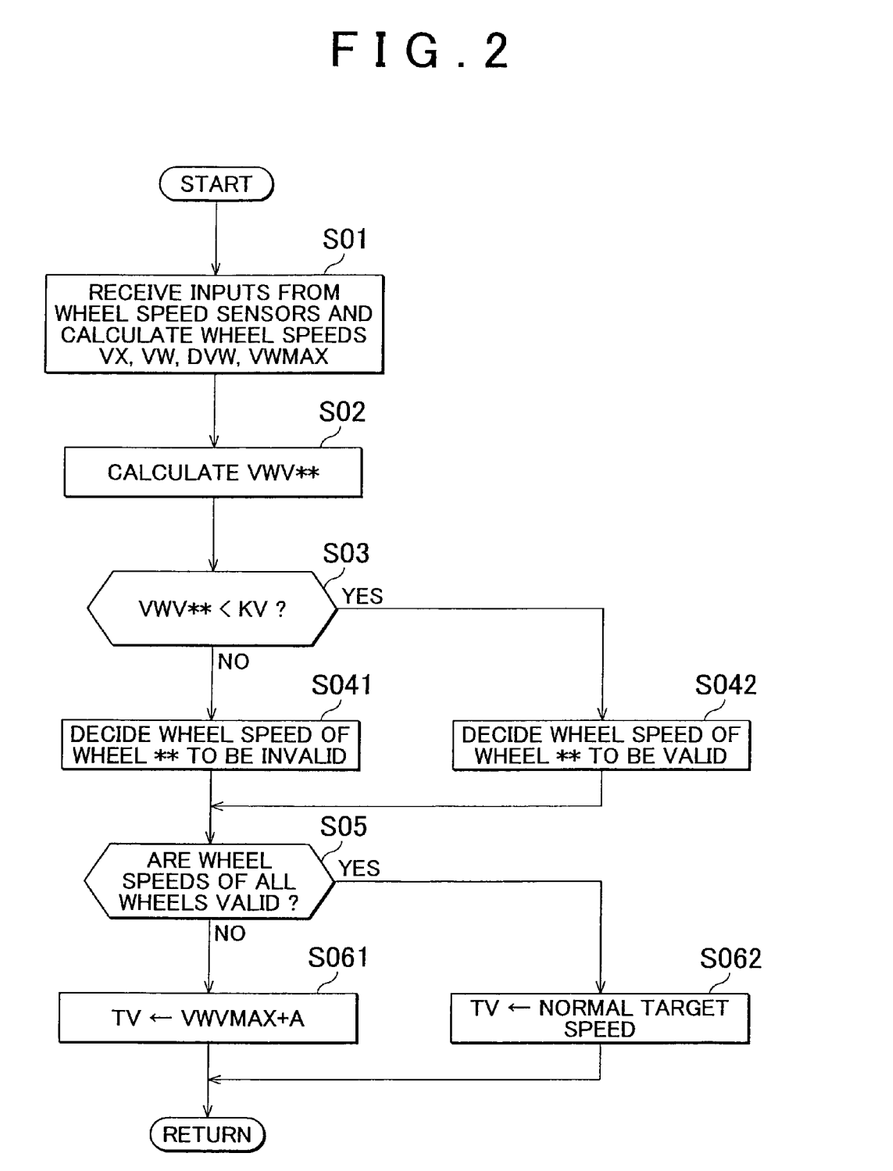
FIG. 2 is a flowchart of a target wheel speed setting process in the vehicle control device according to the first embodiment.

Referring next to the flowchart of FIG. 2, a target wheel speed setting process in the vehicle control device according to the first embodiment is described.

As shown in FIG. 2, the CPU 51 calculates the wheel speeds VW of each wheel based on inputs from the wheel speed sensors 41 when the vehicle 10 is in motion (step S01). Then, the CPU 51 calculates wheel speed validity thresholds VWV for each wheel based on the calculated wheel speeds (step S02). Here, "" indicates the wheel that serves as the target of the update process among the right front wheel 11FR, the left front wheel 11FL, the right rear wheel 11RR and the left rear wheel 11RL. For example, wheel speed validity thresholds VWV** represent the wheel speed validity thresholds of the target wheel of the update process, that is, the speeds at which the validity of the output values from the corresponding wheel speed sensors can be assured. The update process may be performed for each wheel separately.

Then, it is determined whether each wheel speed validity threshold VWV of the wheels satisfies the relation: "VWV<KV" (step S03). The value KV may be regarded as the specific threshold speed of the present invention. The specific threshold speed KV is set to a speed that is slightly lower than the target vehicle. For example, if the target wheel speed is 5 km/h, the specific speed threshold value KV is set to 4.8 km/h.

If the relation "VWV<KV" is satisfied (step S03: YES), it is decided that the wheel speed VW is valid (step S042).

If the relation "VWV<KV" is not satisfied, (step S03: NO), it is decided that the wheel speed VW is invalid (step S041).

When the decision is made for each of the wheels, the validity of each wheel speed is then decided (step S05).

If all the wheel speeds are valid (step S05: YES), the CPU 51 sets the target wheel speed TV to a normal value (step S062).

If even one wheel speed is not valid (step S05: NO), the CPU 51 sets the target wheel speed TV to a value obtained by adding a specific value A to the highest wheel speed validity threshold VWVMAX of the four wheel speed validity thresholds (step S061). In other words, the target wheel speed TV is set with reference to the wheel speed sensor 41 for the wheel with the highest wheel speed validity threshold of the four wheels, that is, a wheel speed sensor 41 which has the poorest detection performance of the four wheel speed sensors. The specific value A, which is a value determined in advance based on the minimum calculation unit for use in calculation of the wheel speeds, is added to add an estimated value of calculation error to the wheel speed validity threshold VWVMAX. Then, because the wheel speeds each wheel has been calculated appropriately when the vehicle speed is close to the target wheel speed, a vehicle control may be properly performed to achieve the target wheel speed.

Figure 3:
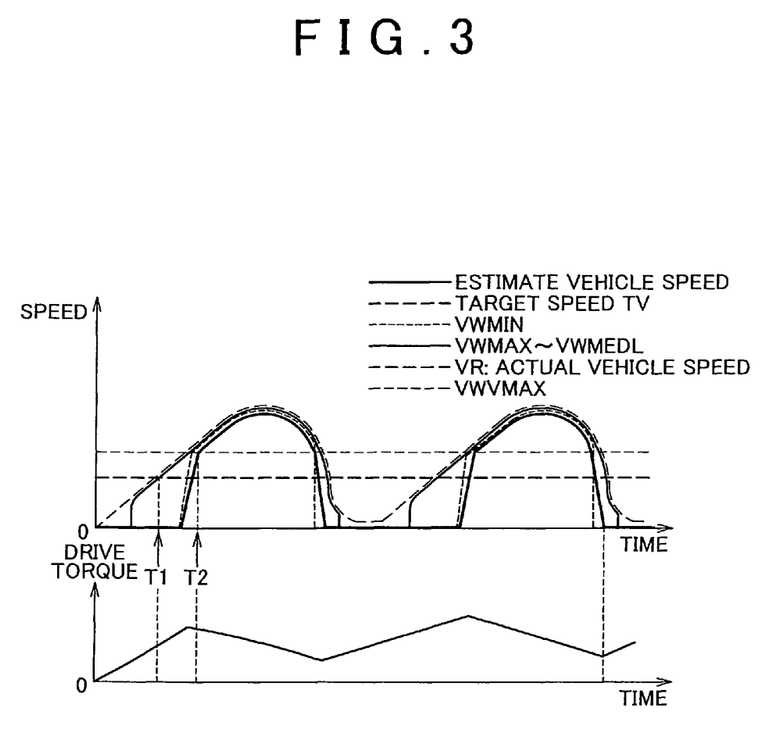
FIG. 3 is a time chart that shows changes in speeds in a vehicle control device according to a comparative example and the associated changes in drive torque associated.
Figure 4:
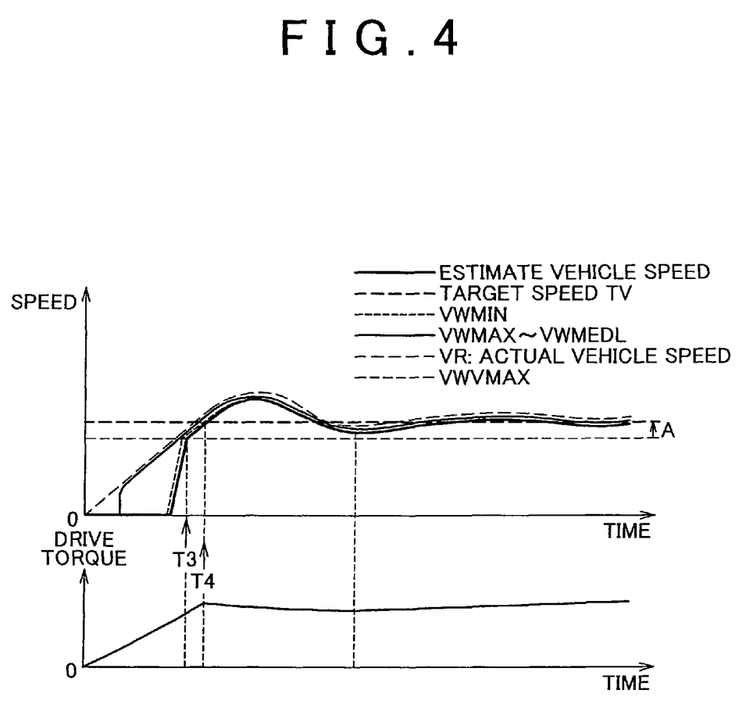
FIG. 4 is a time chart that shows changes in speeds in the vehicle control device according to the first embodiment and the associated changes in drive torque.

A comparison with comparative example is made to show the advantage of this operation with reference to the time charts of FIG. 3 and FIG. 4 as needed. FIG. 3 is a time chart that shows changes in speeds in a vehicle control device according to a comparative example and the associated changes in drive torque. FIG. 4 is a time chart that shows changes in speeds in the vehicle control device according to the first embodiment and the associated changes in drive torque.

In FIG. 3, the target wheel speed TV is lower than the highest wheel speed validity threshold VWVMAX of the four wheel-speed validity thresholds. In reality, the actual vehicle speed reaches the target wheel speed TV at a time T1. However, the lowest wheel speed VWMIN of the four wheel speeds is still 0 since it is not higher than the wheel speed validity threshold VWVMAX. Then, the vehicle speed estimated based on the wheel speeds including the wheel speed VWMIN is lower than the actual vehicle speed, and the fact that the actual vehicle speed has reached the target wheel speed TV cannot be detected. Thus, the drive torque continues to be increased. It is not until time T2, when the wheel speed VWMIN exceeds the wheel speed validity threshold VWVMAX, that a value close to the actual vehicle speed is calculated. At that time, because the drive torque has been increased more than necessary, the estimated vehicle speed exceeds the target wheel speed TV. Thus, the drive torque is decreased. However, in a range in which the wheel speed VWMIN is lower than the wheel speed validity threshold VWVMAX, the vehicle speed can also not be estimated accurately and speed hunting occurs. Accordingly, it is difficult to maintain the target wheel speed TV.

In the embodiment shown in FIG. 4, on the other hand, if the wheel speeds of any of the four wheels are invalid, the target wheel speed TV is set to a value obtained by adding a specific value A to the highest wheel speed validity threshold VWVMAX of the four wheel speed validity thresholds in step S061 of FIG. 2. Then, the target wheel speed TV is not lower than the highest wheel speed validity threshold VWVMAX. Therefore, the wheel speed VWMIN exceeds the wheel speed validity threshold VWVMAX and all the wheel speeds become valid at time T3 before the target wheel speed TV is achieved. Then, at time T4, the fact that the vehicle speed has reached the target wheel speed TV may be detected properly based on a vehicle speed estimated appropriately. As a result, the drive torque is not increased more than necessary and therefore speed hunting can be prevented.

Figure 5:
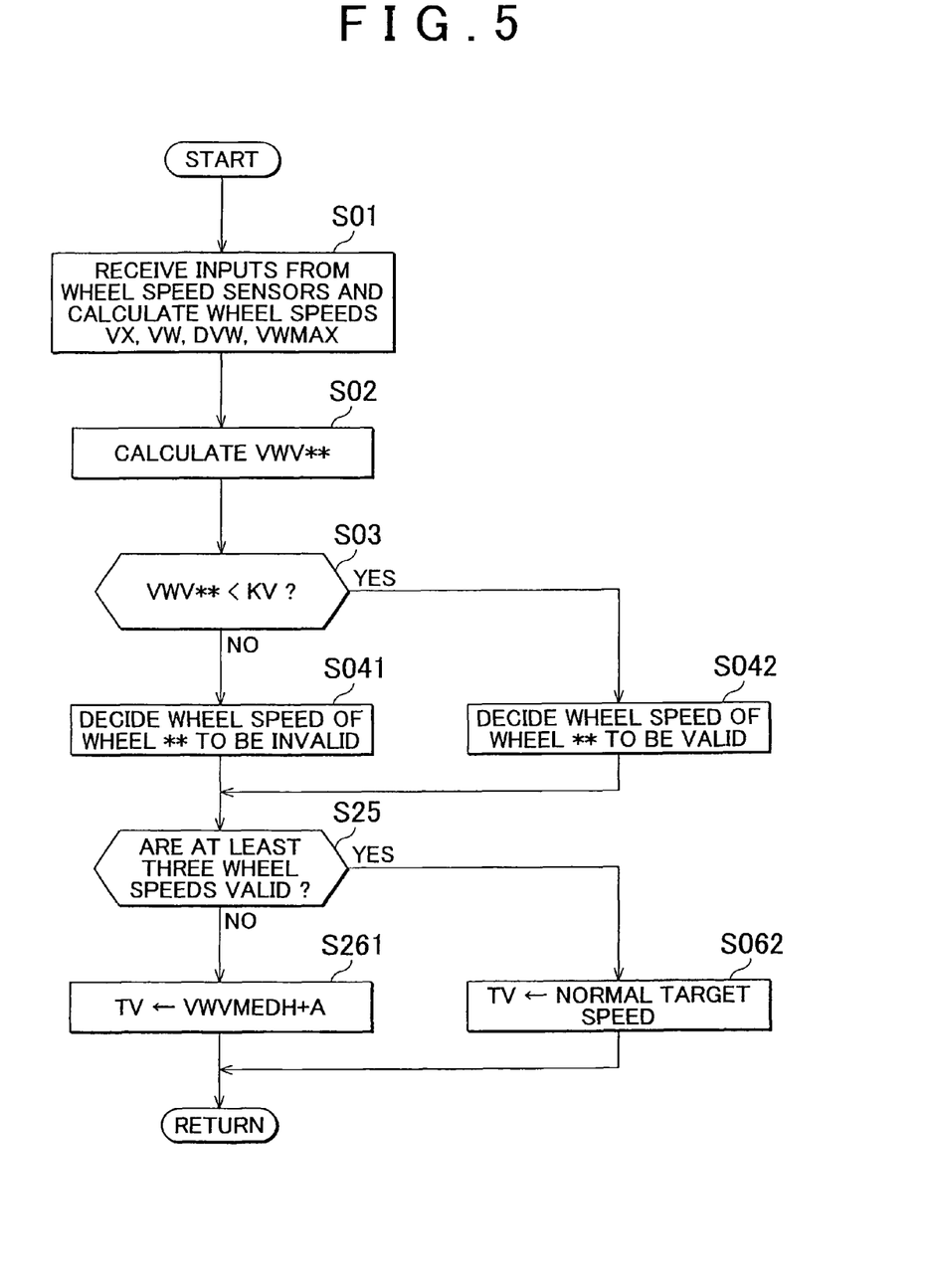
FIG. 5 is a flowchart of a target wheel speed setting process in a vehicle control device according to a second embodiment.

Referring to the flowchart of FIG. 5, the operation of the vehicle control device according to the second embodiment is described. The configuration of the vehicle equipped with the vehicle control device according to the second embodiment may be the same as that of the vehicle of the first embodiment shown in FIG. 1 and hence its detailed description is omitted.

As shown in FIG. 5, it is first decided whether each wheel speed is valid in the same manner as in the flowchart shown in FIG. 2 (step S01 to S042).

In this embodiment, in particular, the vehicle speed is estimated all the wheel speeds with the exception of VWMIN, and it is decided whether "at least three wheel speeds are valid" instead of the decision in step S05 in FIG. 2 (step S25).

Figure 6:
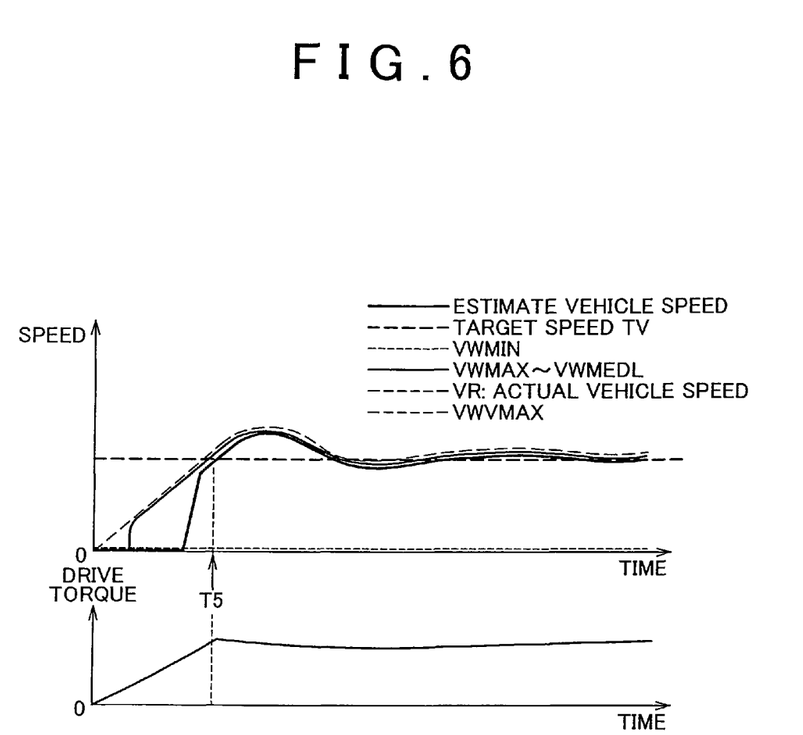
FIG. 6 is a time chart that shows changes in speeds in the vehicle control device according to the second embodiment and the associated changes in drive torque when the vehicle speed is set based on all the wheel speeds with the exception of VWMIN and only one wheel speed is invalid.

If "at least three wheel speeds are valid" (step S25: YES), the CPU 51 sets the target wheel speed TV to a normal value (step S062). The effect in this case is shown in FIG. 6. FIG. 6 is a time chart that shows changes in speeds in the vehicle control device according to the second embodiment and that associated changes in drive torque when the vehicle speed is set using all the wheel speeds with the exception of VWMIN and only one of the wheel speeds is invalid.

As shown in FIG. 6, the lowest wheel speed VWMIN is the invalid wheel speed and 0 from the beginning to the end. However, the vehicle speed is estimated using all the wheels speeds with the exception of VWMIN. Then, even if the target wheel speed TV has been set to a normal value, the fact that the vehicle speed has reached the target wheel speed TV at a time T5 is detected properly.

Figure 7:
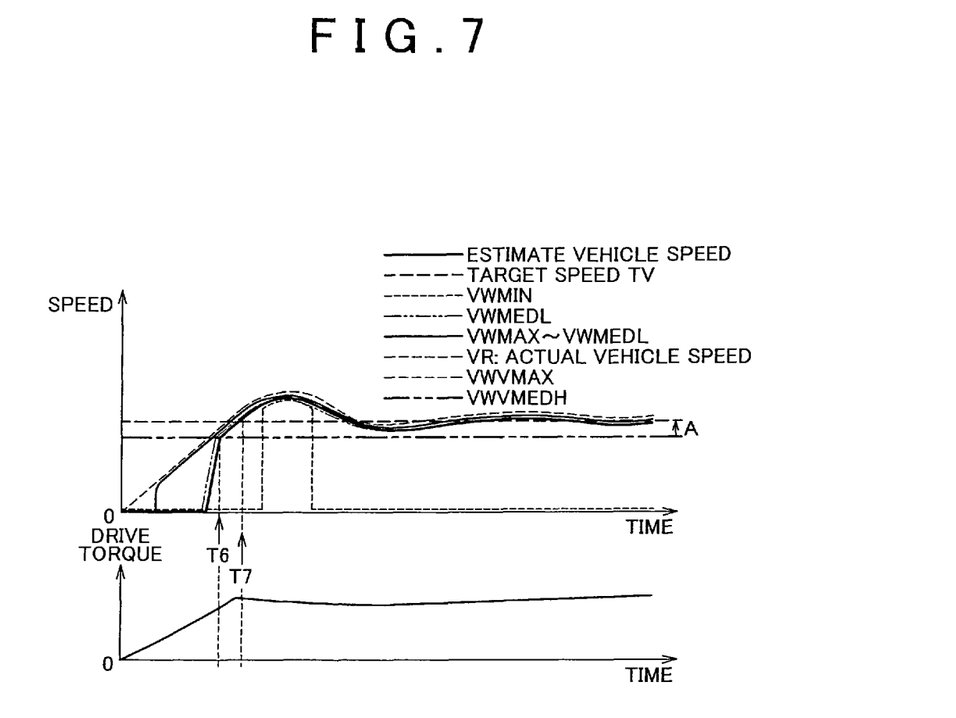
FIG. 7 is a time chart that shows changes in speeds in the vehicle control device according to the second embodiment and the associated changes in drive torque when the vehicle speed is set based on all the wheel speeds with the exception of VWMIN and two wheel speed are invalid)

If the result of the decision on whether "at least three wheel speeds are valid" is negative (step S25: NO), in other words, at least two of the four wheel speeds are invalid, the CPU 51 sets the target wheel speed TV to a value obtained by adding a specific value A to the second highest wheel speed validity threshold VWVMEDH (step S261). The effect in this case is shown in FIG. 7. FIG. 7 is a time chart that shows changes in speeds in the vehicle control device according to the second embodiment and the associated changes in drive torque when the vehicle speed is set based on all the wheel speeds except for VWMIN and two wheel speeds are invalid.

In the case of FIG. 7, it is determined that the lowest wheel speed VWMIN and the second lowest wheel speed VWMEDL of the four wheel speeds are invalid. In this case, the lowest wheel speed VWMIN is excluded from, but the second lowest wheel speed VWMEDL is included in the estimation of the vehicle speed is estimated based on the wheel speeds excluding. Thus, the reliability of the estimated vehicle speed is low because of the invalid wheel speed VWMEDL. However, in this embodiment, because the target wheel speed TV is set to a value obtained by adding a specific value A to the second highest wheel speed validity threshold VWVMEDH, the second lowest wheel speed VWMEDL of the four wheel speeds exceeds the wheel speed validity threshold VWVMEDH at time T6 before the target wheel speed TV is achieved. Then, at time T7, the wheel speeds used to estimate the vehicle speed have become all valid and the fact that the vehicle speed has reached the target wheel speed TV may be properly detected. As a result, the drive torque is not increased more than necessary and therefore speed hunting is prevented.

Figure 8:
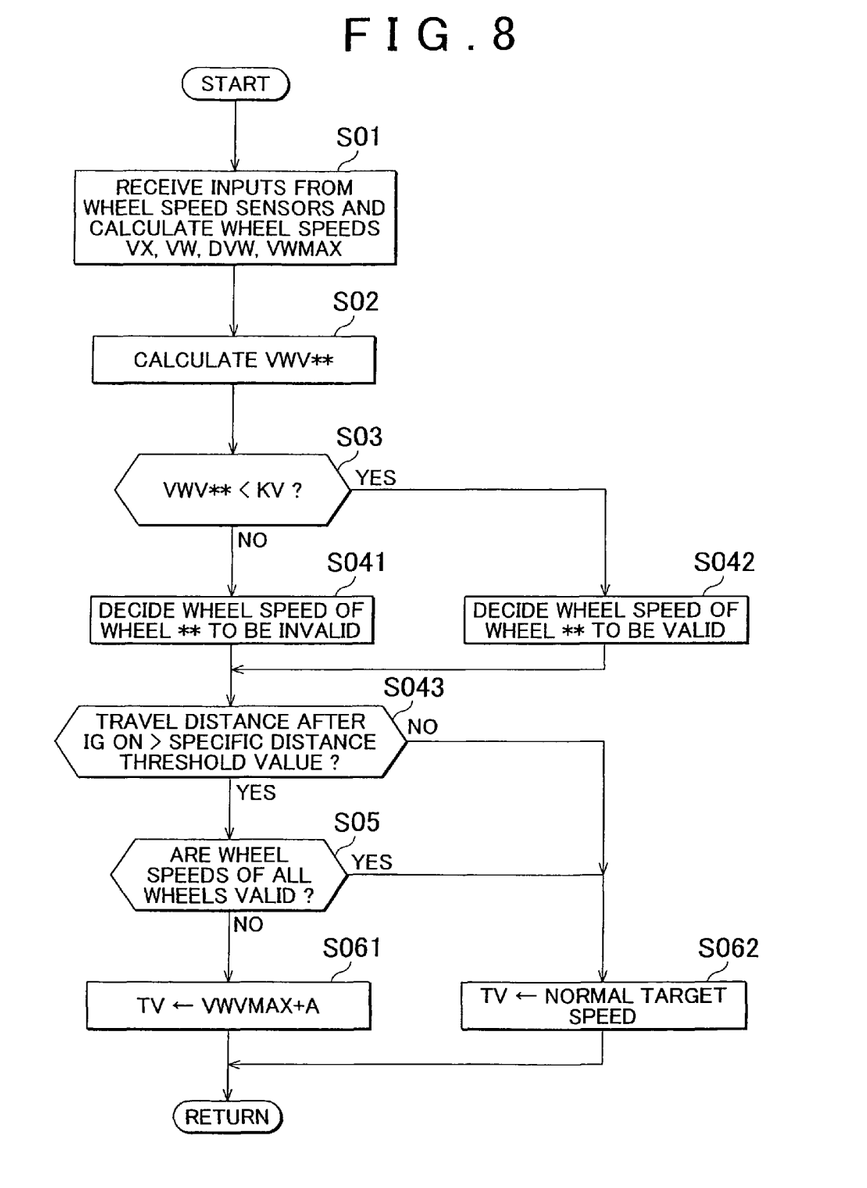
FIG. 8 is a flowchart of a target wheel speed setting process in a vehicle control device according to a third embodiment.
Figure 9:
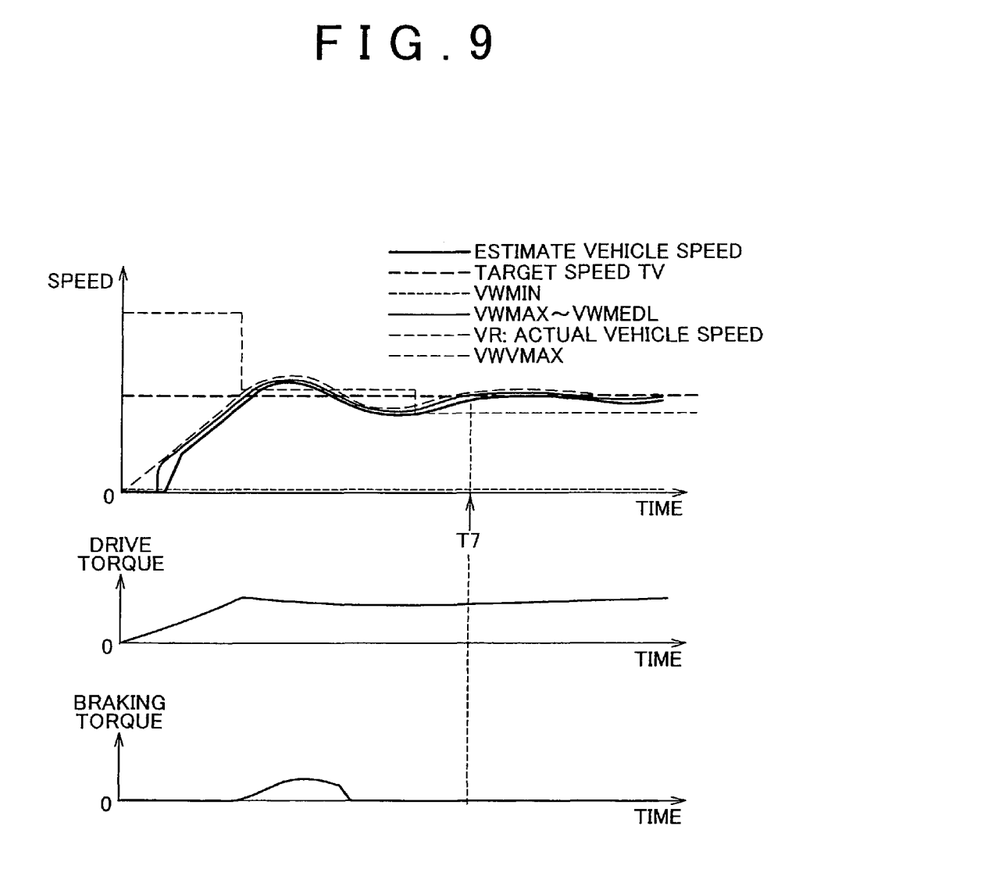
FIG. 9 is a time chart that shows changes in speeds in the vehicle control device according to the third embodiment, and the associated changes in drive torque and braking torque, when all wheel speeds are valid.
Figure 10:
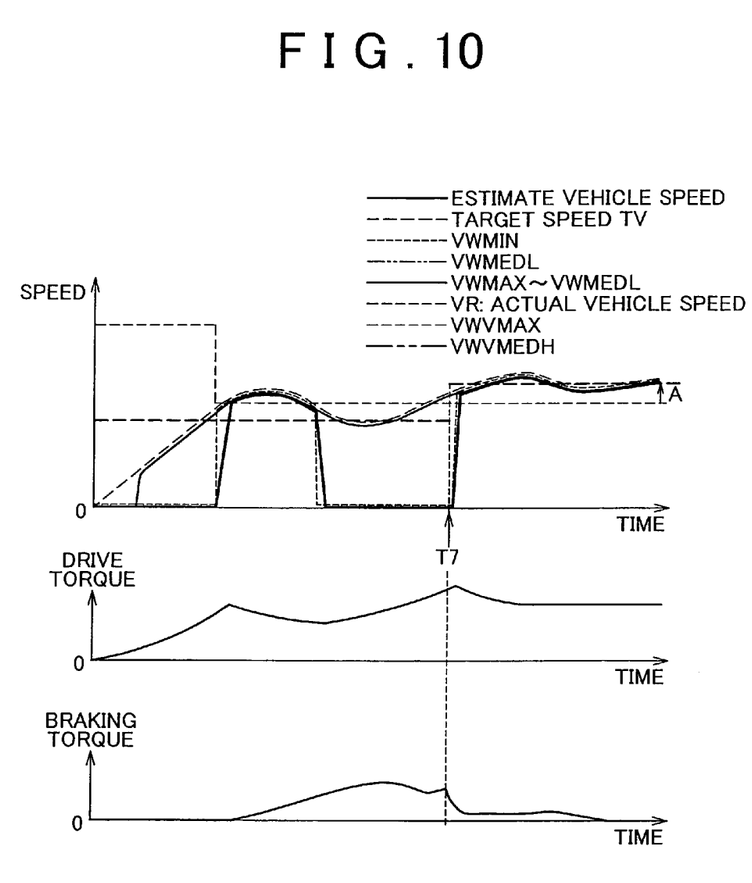
FIG. 10 is a time chart that shows changes in speeds in the vehicle control device according to the third embodiment and the associated changes in drive torque and braking torque when at least one wheel speed is invalid.

Referring to the flowchart of FIG. 8, the operation of a vehicle control device according to a third embodiment is described. The description of FIG. 8 is made with reference to FIG. 9 and FIG. 10 as needed. FIG. 9 is a time chart that shows changes in the speeds in the vehicle control device according to the third embodiment and the associated changes in drive torque and braking torque when each wheel speed is valid. FIG. 10 is a time chart that shows changes in the speeds in the vehicle control device according to the third embodiment and the associated changes in drive torque and braking torque when at least one wheel speed is invalid. The configuration of the vehicle equipped with the vehicle control device according to the third embodiment may be the same as that of the vehicle of the first embodiment shown in FIG. 1 and hence its detailed description is omitted.

As shown in FIG. 8, it is first decided whether each wheel speed is valid in the same manner as in the flowchart shown in FIG. 2 (step S01 to S042).

This embodiment sets a target wheel speed properly immediately after IG-ON (that is, immediately after the ignition switch is turned on) in particular. It is considered that the wheel speed validity thresholds VWV of each wheel has not been updated are at the default values immediately after IG-ON, and all wheel speeds VW may be decided to be invalid even if the wheel speed sensors 41 are all functioning normally. Thus, in this embodiment, it is decided whether the relation "travel distance after IG-ON>specific distance threshold value" is satisfied (step S043). Here, the specific threshold distance is a distance determined in advance as the distance the vehicle must travel before the wheel speed validity thresholds VWV are updated sufficiently after IG-ON, and the wheelbase or the length of the vehicle 10 may be used as the specific distance threshold value.

If it is decided that the relation "travel distance after IG-ON>specific distance threshold value" is not satisfied (step S043: NO), the CPU 51 sets the target wheel speed TV to a normal value regardless of the validity of the wheel speeds because it is likely that the wheel speed validity thresholds VWV have not been sufficiently updated (step S062). Then, the target wheel speed TV is prevented from being set to an excessively high value. FIG. 9 and FIG. 10 show a state in which the target wheel speed TV is set to a normal value regardless of the validity of the wheel speeds from the time of IG-ON (that is, a time of 0) to time T7 when the travel distance after the IG-ON reaches the specific threshold distance. In this case, as shown in FIG. 10, the actual vehicle speed is prevented from greatly exceeding the target wheel speed by the vehicle control involving braking torque control although some speed hunting occurs.

If it is decided that the relation "travel distance after IG-ON>specific threshold distance" is satisfied (step S043: YES), because it is likely that the wheel speed validity thresholds VWV have been sufficiently updated, the target wheel speed TV is set based on the validity of the wheel speeds VW and the wheel speed validity thresholds VWV as in the first embodiment (step S05 to step S062). Thus, proper vehicle control can be performed to achieve the target wheel speed TV.

The vehicle control device according to each embodiment of the present invention controls the driving force and braking force that is applied to the vehicle 10 to approach a target wheel speed that is calculated based on, for example, various sensor information, vehicle information or information about operations of the driver. In the control for bringing the vehicle speed to the target wheel speed, it is possible to improve the accuracy in matching the vehicle speed with the target wheel speed.

Each determination part determines the wheel speed of the vehicle wheel at which the determination part is provided. The determination parts are wheel speed sensors 41FR, 41FL, 41RR and 41RL that detect the wheel speed of a wheel based on the period of a signal that varies with the rotation of the wheel, for example. In the case of a four-wheel vehicle, each wheel may be provided with a determination part. In view of variations among the wheels, at least two of the wheels may be provided with a determination part.

A calculation part calculates a wheel speed validity threshold for each wheel based on the determined wheel speeds. The wheel speed validity threshold for a wheel is the minimum wheel speed that can be determined by the corresponding determination part. The determined wheel speed of a wheel is considered invalid (in other words, unreliable) and regarded as 0 km/h, for example, if it is below the wheel speed validity threshold for the wheel. The default values of the wheel speed validity thresholds are set in advance as the minimum wheel speed value which the determination parts can assure in the manufacturing facility of the vehicle. For example, the default values may be 3 km/h. Because the default values of the wheel speed validity thresholds are merely estimated values and are likely to exceed the actual wheel speed validity thresholds, the default values are updated as appropriate to make them closer to the actual wheel speed validity thresholds by various methods.

A decision part decides whether the wheel speed of each wheel is valid based on whether the wheel speed validity threshold calculated for the wheel is lower than a specific speed threshold value. That is, if the wheel speed validity threshold calculated for a wheel is below a specific speed threshold vale, the decision part decides that the wheel speed determined for the wheel is valid. Here, the specific speed threshold value may be set as the lowest speed that the wheel speed sensors 41FR, 41FL, 41RR and 41RL are able to measure.

A setting part resets the target wheel speed to a value that is higher than one of the wheel speed validity thresholds calculated for the wheels depending on the result of the decision by the decision part. For example, if it is decided that one of the wheel speeds is invalid, the setting part resets the target wheel speed to a value that is higher than the highest of the calculated wheel sped validity thresholds.

An estimation part estimates the vehicle speed based on the wheel speeds determined by the determination part. For example, the estimation part estimates the vehicle speed based on the average of the valid wheel speeds.

Because the target wheel speed is reset as described above and the vehicle control is executed to approach the vehicle speed at the new target wheel speed, the following advantage is obtained. If one of the wheel speed validity thresholds calculated for the wheels is exceeds the target wheel speed, the target wheel speed is reset to a value that is higher than the wheel speed validity threshold. Thus, the wheel speeds used to estimate the vehicle speed become valid before the reset target wheel speed is achieved. As a result, the vehicle speed may be properly estimated and therefore speed hunting is prevented.

The setting part may reset the target wheel speed to a speed higher than any of the wheel speed validity thresholds calculated for the wheels when the decision part determines that at least one wheel speed is invalid.

In this case, if it is determined that at least one wheel speed is invalid, the target wheel speed is reset to a value that is higher than any of the wheel speed validity thresholds calculated for the wheels. Then, the wheel speeds to estimate the vehicle body speed become valid before the reset target wheel speed is achieved and therefore speed hunting is prevented.

If the estimation part estimates the vehicle speed based on the valid wheel speeds and excludes at least the lowest wheel speed, the setting part may reset the target wheel speed to a value that is higher than any of the wheel speed validity thresholds for the wheels corresponding to the other wheel speeds.

Then, when the lowest of the four wheel speeds, which is very likely to be abnormal, is excluded, for example, the vehicle speed is estimated based on the other wheel speeds. In this case, it is preferred that the lowest wheel speed of the other wheel speeds (that is, the second lowest wheel speed of the four wheel speeds) become valid before the target wheel speed is achieved. Thus, the setting part resets the target wheel speed to a speed that is above the second highest wheel speed validity threshold of the four wheel speed validity thresholds, that is, the highest of the wheel speed validity thresholds for the other three wheels. Then, the other wheel speeds used to estimate the vehicle speed become valid before the reset target wheel speed is achieved and therefore speed hunting is prevented.

The vehicle control device may further include a prohibition part that prohibits the setting part from resetting the target wheel speed until the distance traveled by the vehicle after the vehicle was started exceeds a specific distance or until the time elapsed since the start of the vehicle exceeds a specific period.

It is supposed that the wheel speed validity thresholds have not been sufficiently updated before the distance traveled by the vehicle after the start of the vehicle exceeds a specified distance or before the time elapsed since the start of the vehicle exceeds a specified period and the wheel speed validity thresholds calculated for the wheels are too high as compared to an initial target wheel speed. In such a case, the resetting of the target wheel speed by the setting part is prohibited to prevent the target wheel speed from being set to too high a value. The start of the vehicle is when the ignition switch is turned on, for example. The specific distance or the specific period is a threshold value that may be determined in advance as the distance or time period necessary to update the wheel speed validity thresholds sufficiently during travel immediately after the ignition switch is turned on.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A vehicle control device that is applied to a vehicle to approach a target wheel speed, the vehicle control device comprising:
   a plurality of wheel speed sensors, each of which determines a wheel speed of a corresponding one of a plurality of wheels of the vehicle;
   a calculation part that calculates a wheel speed validity threshold for each wheel based on the determined wheel speed;
   a decision part that decides whether each wheel speed is valid depending on whether the calculated wheel speed validity threshold of each wheel is below a specified threshold speed;
   a setting part that resets the target wheel speed to a speed that is higher than one of the wheel speed validity thresholds calculated for the wheels depending on the result of the decision by the decision part; and
   an estimation part that estimates the vehicle speed based upon the determined target wheel speed if the calculated wheel speed validity thresholds are determined to be all valid, and estimates the vehicle speed based upon the reset target wheel speed if at least one of the calculated wheel speed validity thresholds is determined to be invalid.

2. The vehicle control device according to claim 1, wherein the decision part decides that the wheel speed is valid if the wheel speed validity threshold for the wheel is lower than the specified threshold speed, and the setting part resets the target wheel speed to a speed that is higher than one of the calculated wheel speed validity thresholds when the decision part decides that at least one of the wheel speeds is not valid.

3. The vehicle control device according to claim 1, wherein the estimation part estimates the vehicle speed based on the wheel speeds decided to be valid by the decision part.

4. The vehicle control device according to claim 1, wherein the setting part resets the target wheel speed to a speed that is higher than any of the calculated wheel speed validity thresholds when the decision part has decided that at least one of the wheel speeds is invalid.

5. The vehicle control device according to claim 1, wherein, when the estimation part estimates the vehicle speed based on the wheel speeds of the wheels determined except at least one relatively low wheel speed, the setting part resets the target wheel speed to a speed that is higher than any of the wheel speed validity thresholds for the wheels corresponding to the other wheel speeds.

6. The vehicle control device according to claim 1, further comprising a prohibition part that prohibits the setting part from resetting the target wheel speed until the traveled distance by the vehicle since the start of the vehicle exceeds a specified distance or the time elapsed since the start of the vehicle exceeds a specified period.

7. A vehicle control device that is applied to a vehicle to maintain a target wheel speed, the vehicle control device comprising:
 a plurality of means for determining a wheel speed of a plurality of wheels of the vehicle, each of which determines the wheel speed of a corresponding one of the plurality of wheels of the vehicle;
 means for calculating a wheel speed validity threshold for each wheel based on the determined wheel speed;
 means for deciding whether each wheel speed is valid depending on whether the calculated wheel speed validity threshold for each wheel is below a specified threshold speed;
 means for resetting the target wheel speed to a speed that is higher than one of the wheel speed validity thresholds calculated for the wheels depending on the result of the decision by the means for deciding; and
 means for estimating the vehicle speed based upon the determined target wheel speed if the calculated wheel speed validity thresholds are determined to be all valid, and based upon the reset target wheel speed if at least one of the calculated wheel speed validity thresholds is determined to be invalid.

8. A vehicle control method that is applied to a vehicle to maintain a target wheel speed, the vehicle control method comprising:
 determining wheel speeds of a plurality of wheels of the vehicle;
 calculating on a processor a wheel speed validity threshold for each wheel based on the determined wheel speed;
 deciding whether each wheel speed is valid depending on whether the calculated wheel speed validity threshold for each wheel is below a specified threshold speed;
 resetting the target wheel speed to a speed higher than one of the wheel speed validity thresholds calculated for the wheels depending on the result of the decision; and
 estimating the vehicle speed based upon the determined target wheel speed if the calculated wheel speed validity thresholds are determined to be all valid, and the reset target wheel speed if at least one of the calculated wheel speed validity thresholds is determined to be invalid.

* * * * *